US011954996B2

(12) United States Patent
Xu

(10) Patent No.: US 11,954,996 B2
(45) Date of Patent: Apr. 9, 2024

(54) SYSTEM AND METHOD FOR IMPROVING NETWORK CONNECTION RELIABILITY OF IOT TRACKING AND EMERGENCY RESPONSE DEVICES

(71) Applicant: MICRON ELECTRONICS LLC, Boca Raton, FL (US)

(72) Inventor: Jun Xu, Boca Raton, FL (US)

(73) Assignee: MICRON ELECTRONICS LLC, Boca Raton, FL (US)

( * ) Notice: Subject to any disclaimer, the term of this patent is extended or adjusted under 35 U.S.C. 154(b) by 4 days.

(21) Appl. No.: 17/546,566

(22) Filed: Dec. 9, 2021

(65) Prior Publication Data

US 2022/0180731 A1 Jun. 9, 2022

Related U.S. Application Data

(60) Provisional application No. 63/123,085, filed on Dec. 9, 2020.

(51) Int. Cl.
*G08B 29/12* (2006.01)
*G06N 20/00* (2019.01)
*G08B 25/01* (2006.01)
*G08B 29/06* (2006.01)

(52) U.S. Cl.
CPC .......... *G08B 29/123* (2013.01); *G06N 20/00* (2019.01); *G08B 25/016* (2013.01); *G08B 29/06* (2013.01)

(58) Field of Classification Search
CPC .... G08B 25/016; G08B 29/06; G08B 25/009; G08B 27/005; G08B 29/185; H04B 17/0085
See application file for complete search history.

(56) References Cited

U.S. PATENT DOCUMENTS

| | | | |
|---|---|---|---|
| 2006/0176167 A1* | 8/2006 | Dohrmann | H04M 11/04 340/506 |
| 2010/0312881 A1* | 12/2010 | Davis | G08C 17/02 709/224 |
| 2014/0199946 A1* | 7/2014 | Flippo | H04B 17/0085 455/67.14 |
| 2022/0172599 A1* | 6/2022 | Mehta | G08B 25/009 |

* cited by examiner

*Primary Examiner* — Mirza F Alam
(74) *Attorney, Agent, or Firm* — ANOVA LAW GROUP, PLLC

(57) ABSTRACT

A method for testing a network connection of an emergency response system at least including a remote device and a central station includes: receiving, by the remote device, a user's instruction or an automatically triggered event for initiating a test of the network connection between the remote device and the central station; in response to the user's instruction or the automatically triggered event, sending, by the remote device, a first test signal to the central station; receiving, by the remote device, a first response signal sent from the central station for acknowledging the first test signal; and in response to receiving no first response signal from the central station for acknowledging the first test signal, alerting, by the remote device, a user of the remote device about a failure of the network connection.

20 Claims, 4 Drawing Sheets

SYSTEM AND METHOD FOR IMPROVING NETWORK CONNECTION RELIABILITY OF IOT TRACKING AND EMERGENCY RESPONSE DEVICES

CROSS-REFERENCE TO RELATED APPLICATION

This application claims the priority of U.S. Provisional Patent Application No. 63/123,085, filed on Dec. 9, 2020, the entire content of which is incorporated herein by reference.

FIELD OF THE INVENTION

The present invention generally relates to security monitoring systems and, more particularly, to a method for improving network connection reliability of an emergency response system, a remote device, and a central station.

BACKGROUND

Personal emergency response systems (PERS) or mobile PERS (mPERS) often communicate with an Internet of Things (IoT) tracking and emergency response device through a network connection. Due to the nature of the PERS and mPERS, such communication often occurs only during emergency. In absence of emergency, the IoT tracking and emergency response deice may not connect to a communication network all the time to save battery power. To provide a reliable network connection to the IoT tracking and emergency response device, testing voice, text, and data (including but not limited to GNSS data) are transmitted periodically to verify the network connection.

BRIEF SUMMARY OF THE DISCLOSURE

One aspect of the present disclosure provides a method for testing a network connection of an emergency response system at least including a remote device and a central station. The method includes: receiving, by the remote device, a user's instruction or an automatically triggered event for initiating a test of the network connection between the remote device and the central station; in response to the user's instruction or the automatically triggered event, sending, by the remote device, a first test signal to the central station; receiving, by the remote device, a first response signal sent from the central station for acknowledging the first test signal; and in response to receiving no first response signal from the central station for acknowledging the first test signal, alerting, by the remote device, a user of the remote device about a failure of the network connection.

Another aspect of the present disclosure provides a remote device in an emergency response system at least including the remote device and a central station. The remote device includes a memory storing program instructions, and a processor configured to execute the program instructions to perform, for testing a network connection of the emergency response system: receiving a user's instruction or an automatically triggered event for initiating a test of the network connection between the remote device and the central station; in response to the user's instruction or the automatically triggered event, sending a first test signal to the central station; receiving a first response signal sent from the central station for acknowledging the first test signal; and in response to receiving no first response signal from the central station for acknowledging the first test signal, alerting a user of the remote device about a failure of the network connection.

Another aspect of the present disclosure provides a central station in an emergency response system at least including a remote device and the central station. The central station includes a memory storing program instructions, and a processor configured to execute the program instructions to perform: monitoring a first test signal status of the remote device; in response to the first test signal status of the remote device satisfying a first test signal condition, sending a second test signal to the remote device; receiving a second response signal sent from the remote device for acknowledging the second test signal; and in response to receiving no second response signal from the remote device for acknowledging the second test signal, alerting an operator of the central station about the failure of the network connection.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 1:
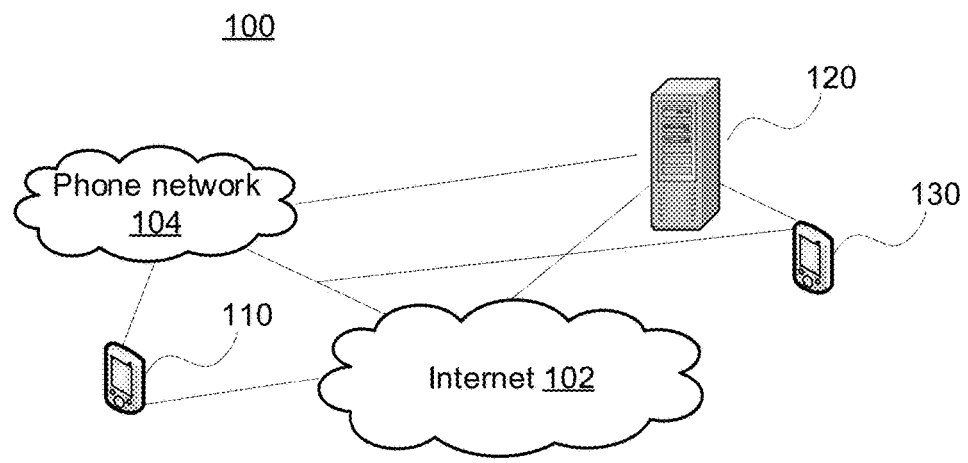
FIG. 1 illustrates an exemplary emergency communication environment incorporating certain aspects of the disclosed embodiments.

FIG. 1 illustrates an exemplary emergency communication environment incorporating certain aspects of the disclosed embodiments. As shown in FIG. 1, communication environment 100 may include the Internet 102, a phone network 104, a remote device 110, a central station 120, and a communication device 130. Other components may be added and certain components may be removed without departing from the principles of the disclosed embodiments.

The Internet 102 may include any private and public computer networks interconnected using the standard transport control protocol/internet protocol (TCP/IP). Internet 102 may carry a large number of services over IP, such as the inter-linked hypertext documents of the World Wide Web (WWW) and electronic mail (or email). Internet 102 may connect a large number of websites. Further, Internet 102 may also carry voice-over IP (VOIP) services to enable voice or the like communications over Internet 102.

The phone network 104 may include any appropriate phone network such as a VOIP network, a public switched telephone network (PSTN), a cellular network, or any other telephone networks.

The remote device 110 may include any appropriate communication device wirelessly communicating with the central station 120. For example, the remote device 110 includes an Internet of Things (IoT) device, a GPS navigation device, a mobile phone, a wearable device, an unmanned aerial vehicle, an emergency response vehicle, or a combination thereof. Although one remote device 110 is shown in FIG. 1, any number and types of wireless devices may be included.

The central station 120 includes a call center, a cloud server, a backend platform, or a combination thereof. The central station 120 may include one or more appropriate computer servers configured to provide various services to users through the Internet 102 and/or the phone network 104. For example, the central station 120 may provide monitoring services (e.g., emergency monitoring, security monitoring, other types of monitoring, etc.), emergency response services, and/or emergency information access services, etc. Although one central station 120 is included, any number of communication servers may be included.

The communication device 130 may include any appropriate device for communicating with the remote device 110 directly through wireless channels. The communication device 130 may also communicate with the central station 120. Under certain circumstances, the communication device 130 and the central station 120 may be used interchangeably.

The remote device 110 may communicate with the central station 120 wirelessly over various networks. For example, the remote device 110 may use any available cellular wireless standards, such as, GSM, GPRS, CDMA, WCDMA, 3G, 4G, LTE, and 5G, etc., 2-way radio, point-to-point, satellite, WiFi, and any other appropriate wireless communication protocols to communicate with the central station 120.

Further, the remote device 110 may communicate with the central station 120 through a wireless service operator or without a wireless service operator. For example, the remote device 110 may communicate with the central station 120 using a wireless operator's short message service (SMS) to exchange information with the central station 120.

In a normal operation or a regular operation, the central station 120 may maintain a database to store various information about associated wireless devices. The remote device 110 may periodically report a device status, such as a battery status of the remote device 110, to the central station 120 according to pre-configured criteria. Further, the central station 120 may configure the remote device 110 remotely.

For example, the central station 120 may set a status reporting period, or may set an emergency monitoring server (e.g., a phone number, an IP address, a SIP number, an IMS URI, etc.) or an intended reporting entity for the remote device 110 to communicate with. When an emergency event or another intended condition happens, the remote device 110 may communicate with the emergency monitoring server or the intended reporting entity automatically. The emergency monitoring server may include the central station 120 or a different entity, e.g., a 911 call center, etc. The intended reporting entity may include any appropriate devices or systems, such as a monitoring center, or a single user device (e.g., the communication device 130).

The communication environment 100 may be applied at various wireless communication systems and applications. For example, the communication environment 100 may include emergency wireless communication, asset tracking and monitoring, logistic, fleet management, and remote control, etc.

Figure 2:
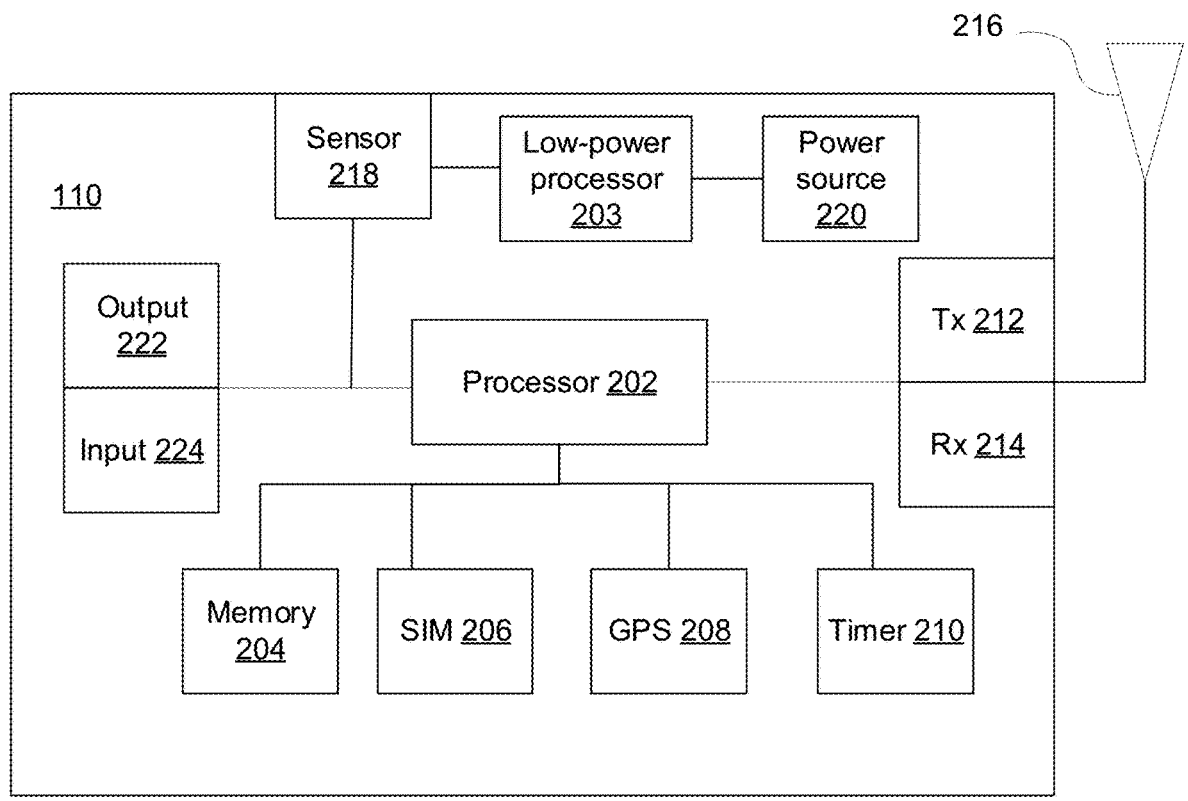
FIG. 2 illustrates a block diagram of an exemplary remote device consistent with the disclosed embodiments.

FIG. 2 illustrates a block diagram of an exemplary remote device 110 consistent with the disclosed embodiments. As shown in FIG. 2, the remote device 110 may include a processor 202, a low-power processor 203, a memory 204, a subscriber identification module (SIM) 206, a global positioning system (GPS) unit 208, a timer 210, a transmitter 212, a receiver 214, an antenna 216, a sensor 218, a power source 220, an output 222, and an input 224. Certain components may be omitted, and other components may be added.

The processor 202 may include any appropriate type of graphic processing unit (GPU), general-purpose microprocessor, digital signal processor (DSP) or microcontroller, and application specific integrated circuit (ASIC), etc. The processor 202 may also include a communication processor, such as a base-band processor for wireless communication, etc.

The processor 202 may execute sequences of computer program instructions to perform various processes associated with the remote device 110. The computer program instructions may be stored and/or loaded in the memory 204 for execution by the processor 202.

The low-power processor 203 may include its own memory and interfaces to connect to the sensor 218. The low-power processor 203 may monitor a sensing signal from the sensor 218 and determine whether the sensing signal triggers a wake-up event. In response to the wake-up event, the low-power processor 203 may connect the power source 220 to a first circuit of the remote device 110. The first circuit may include at least the processor 202 and the memory 204 to perform the normal operation of the remote device 110. The first circuit may further include other components of the remote device 110 that are required for performing the normal operation of the remote device 110. In certain embodiments, the first circuit may also include one or more of the SIM 206, the GPS 208, the timer 210, the transmitter 212, the receiver 214, the antenna 216, the output 222, and the input 224. In certain embodiments, the processor 202 may have the lower-power processor 203 built in.

In certain embodiments, the low-power processor 203 may further include one or more of its own sensor, timer, and low-power machine-to-machine (M2M) communication mechanism for detecting the wake-up event. The circuit for detecting the wake-up event and connecting the power source to the first circuit after the wake-up event is detected is called a second circuit. The second circuit may include at least the low-power processor 203. The second circuit does not perform the normal operation of the remote device 110. The second circuit manages connection of the power source 220 to the first circuit. The second circuit is always connected to the power source 220, but consumes substantially less power than the first circuit.

The memory 204 may include any appropriate memory units, such as random-access memory (RAM), read-only memory (ROM), flash memory, or any other type of memory or storage. The memory 204 may include a non-volatile memory (e.g., flash memory) for storing data as well as program execution states to preserve such information when power is not available. The non-volatile and other volatile memory may also be used for executing computer programs and storing run-time data, etc.

The SIM 206 may include any appropriate subscriber identification card to authenticate the remote device 110 and for accessing a wireless network corresponding to the SIM 206. Although the SIM 206 is used in FIG. 2, any type of identification device may be used.

The GPS 208 may include any appropriate GPS device for providing location information about the remote device 110. The timer 210 may provide various timer functions and associated logics for the remote device 110.

Further, through the antenna 216, the transmitter 212 and the receiver 214 may provide wireless data communication transmission and receiving functions according to various wireless communication protocols. The sensor 218 may include any appropriate type of sensors for sensing one or more parameters such that a sensing signal may be provided to the processor 202 for further processing to determine the sensing parameters, or the sensing signal may be used directly to control certain logics of the remote device 110.

The power source 220 may include any appropriate power source to provide an electrical power to the first circuit and the second circuit, such as the processor 202, the low-power processor 203, and other components of the remote device 110. For example, the power source 220 may include AC power, DC power, solar power, and/or other power. In certain embodiments, the power source 220 may include one or more batteries, and the one or more batteries may be recharged using various types of external power sources. Further, the power source 220 may also include certain control logics for sending battery status to report to the processor 202 and/or to controlling/distributing battery output to the various components. A power-on switch (not shown) may be used to control the power to the various components of the remote device 110, such as the processor 202, the SIM 206, the transmitter 212, and the receiver 214, etc.

The output 222 may be provided for a user of the remote device 110 to receive information from the remote device 110. For example, the output 222 may include any appropriate output device, such as a display, a speaker, or any other output devices.

The input 224 may be provided for the user of the remote device 110 to input information into the remote device 110. For example, the input 224 may include any appropriate input device, such as a keyboard, a microphone, a touch screen, or any other input devices. In certain embodiments, the input 224 may be a single button, which can be pressed by the user such that a communication message can be sent to a pre-configured emergency monitoring server or a pre-configured intended reporting entity.

Figure 3:
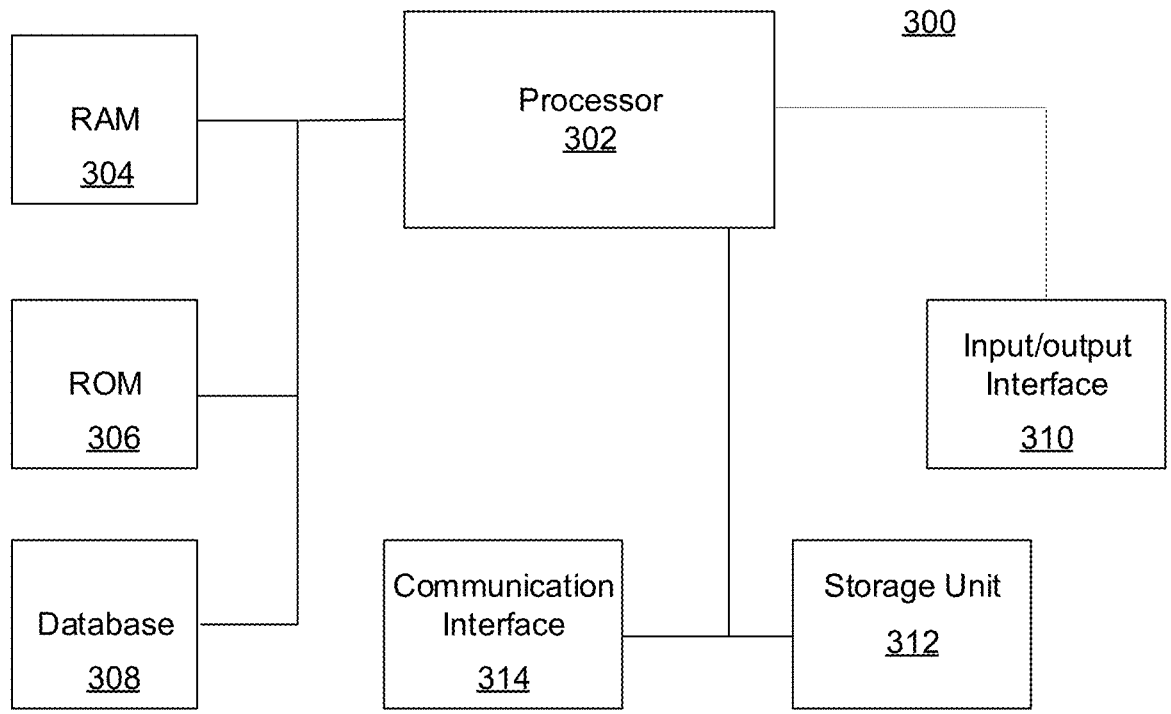
FIG. 3 illustrates a block diagram of an exemplary central station consistent with the disclosed embodiments.

On the other hand, the central station 120 may be implemented by any appropriate computer system. FIG. 3 illustrates a block diagram of an exemplary computing system 300 used to implement central station 120.

As shown in FIG. 3, the computing system 300 may include a processor 302, a random-access memory (RAM) unit 304, a read-only memory (ROM) unit 306, a database 308, an input/output interface unit 310, a storage unit 312, and a communication interface 314. Other components may be added and certain devices may be removed without departing from the principles of the disclosed embodiments.

The processor 302 may include any appropriate type of graphic processing unit (GPU), general-purpose microprocessor, digital signal processor (DSP) or microcontroller, and application specific integrated circuit (ASIC), etc. The processor 302 may execute sequences of computer program instructions to perform various processes associated with the computing system 300. The computer program instructions may be loaded into the RAM 304 for execution by the processor 302 from the ROM 306.

The database 308 may include any appropriate commercial or customized database to be used by the computing system 300, and may also include query tools and other management software for managing the database 308. Further, the input/output interface 310 may be provided for a user or users to input information into the computing system 300 or for the user or users to receive information from the computing system 300. For example, the input/output interface 310 may include any appropriate input device, such as a remote control, a keyboard, a mouse, a microphone, a video camera or web-cam, an electronic tablet, voice communication devices, or any other optical or wireless input devices. The input/output interface 310 may also include any appropriate output device, such as a display, a speaker, or any other output devices.

The storage unit 312 may include any appropriate storage device to store information used by the computing system 300, such as a hard disk, a flash disk, an optical disk, a CR-ROM drive, a DVD or other type of mass storage media, or a network storage. Further, the communication interface 314 may provide communication connections such that the computing system 300 may be accessed remotely and/or communicate with other systems through computer networks or other communication networks via various communication protocols, such as TCP/IP, hyper text transfer protocol (HTTP), etc.

Returning to FIG. 1, during the normal operation, the remote device 110 and the central station 120 may perform certain operations to test a network connection between the remote device 110 and the central station 120. That is, as disclosed, the remote device 110 and the central station 120 may be configured to implement a method for testing the network connection between the remote device 110 and the central station 120 to ensure reliability of the network connection.

For example, in certain embodiments, the remote device 110 may be configured to test the network connection between the remote device 110 and the central station 120 to improve the reliability of the network connection. Testing the network connection may be manually initiated or automatically initiated. On the other hand, the central station 120 may also be configured to test the connection between the remote device 110 and the central station 120.

Figure 4:
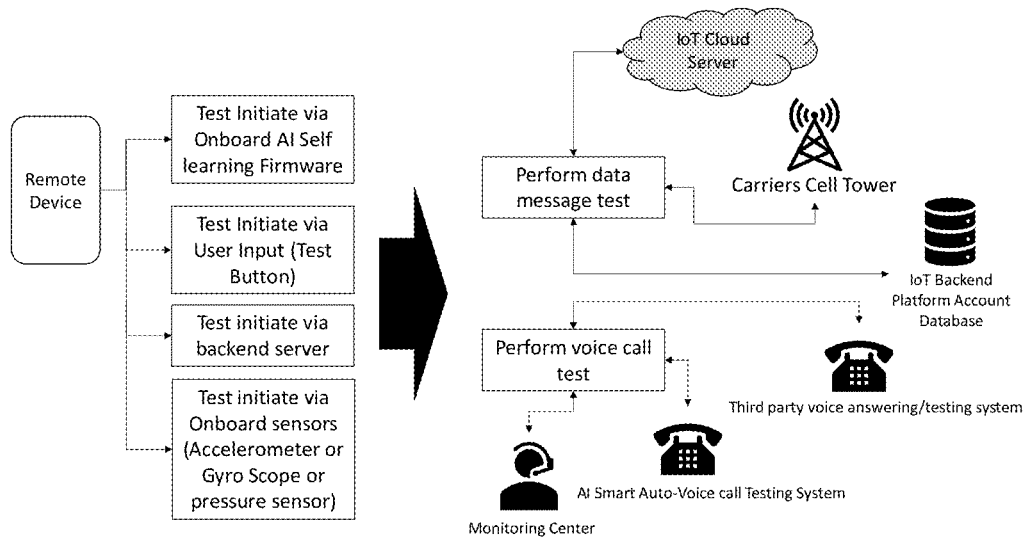
FIG. 4 illustrates an exemplary emergency response system consistent with the disclosed embodiments.

FIG. 4 illustrates an exemplary emergency response system consistent with the disclosed embodiments. In some embodiments, as shown in FIG. 4, the emergency response system is a mobile personal emergency response system (mPERS) or an in-home personal emergency response system (PERS). The emergency communication system includes an mPERS wireless device or a PERS in-home base station, and a monitoring center. The mPERS device is similar to the remote device 110 in FIG. 1. The mPERS device communicates with the monitoring center (i.e., the central station 120) through cellular network such as 4G and 5G wireless networks. The PERS in-home base station is connected to at least one of the phone network 104 or the internet 102 shown in FIG. 1. The PERS in-home base station is connected to a plurality of smart devices monitoring emergency events. The PERS in-home base station communicates with the plurality of smart devices through a communication protocol such as Bluetooth, WiFi, ZigBee, MQTT IoT, CoAP, DDS, NFC, AMQP, LoRaWan, RFID, Z-Wave, Sigfox, Thread, or EnOcean.

The central station may include one or more monitoring servers and a plurality of call center operators or emergency care givers. A user of the mPERS or the PERS in-home base station subscribes to an emergency service, such as a medical emergency service. In case of emergency, the user may press an SOS button of a smart device to initiate reporting an emergency event. The smart device communicates with the mPERS or the PERS in-home base station which reports the emergency event to the monitoring center. Generally, a voice phone call is established between the user and an emergency care giver.

In some embodiments, an emergency monitoring service is provided to the user at home through the PERS in-home base station. mPERS allows the user to leave home and continue to have access to the emergency monitoring service. As shown in FIG. 4, an emergency alert may be sent to the monitoring center directly or indirectly through an Internet of Things (IoT) cloud. The emergency care giver at the monitoring center may initiate a call-back phone call to the user after receiving an emergency report from the user.

As shown in FIG. 4, either the remote device or the central station may initiate testing the network connection. Different types of central stations may be tested differently. Events triggering the testing are described in detail below.

Figure 5:
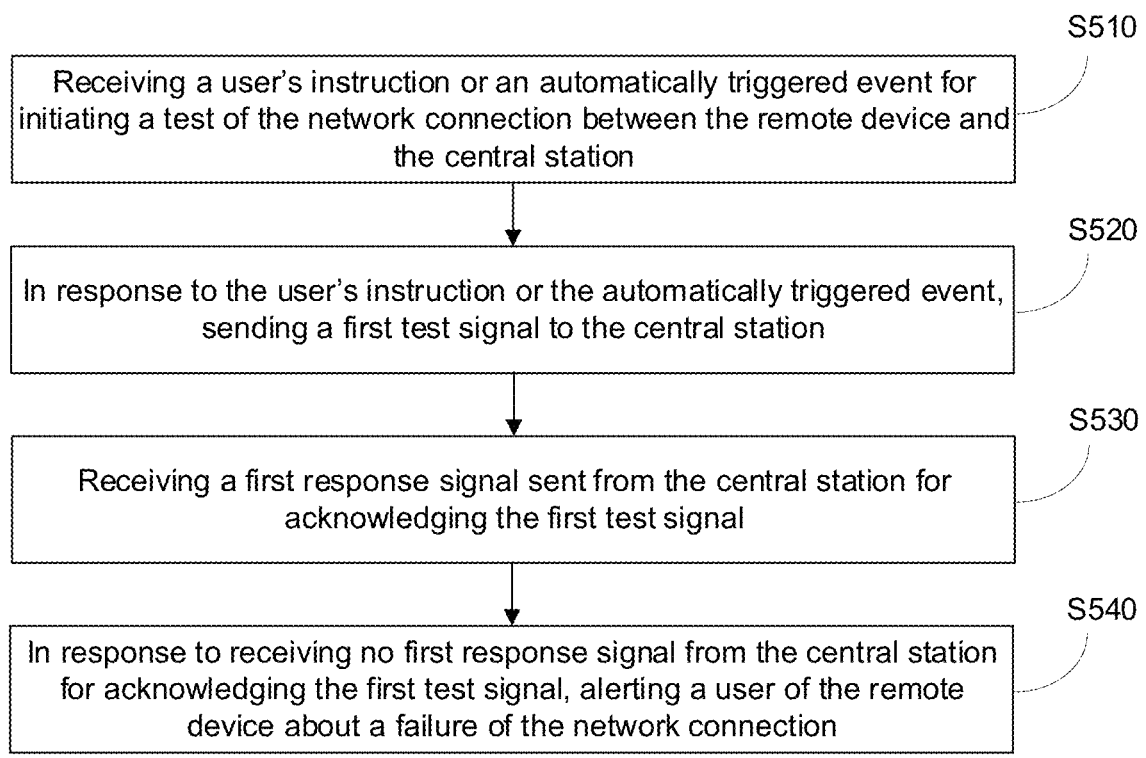
FIG. 5 illustrates a flowchart of an exemplary method for testing a network connection initiated by the remote wireless device consistent with the disclosed embodiments.

FIG. 5 illustrates a flowchart of an exemplary method for testing a network connection initiated by the remote device consistent with the disclosed embodiments. The method is applied to an emergency response system at least including the remote device and a central station. As shown in FIG. 5, the method includes the following processes.

At S510, a user's instruction or an automatically triggered event for initiating a test of the network connection between the remote device and the central station is received.

In some embodiments, the user presses an emergency reporting button on the remote device to initiate testing the network connection between the remote device and the central station. In some other embodiments, certain events are automatically detected by the remote device or a smart device associated with the remote device and the remote device is triggered to initiate testing the network connection.

In some embodiments, the user's instruction includes an operation by a user of the remote device for initiating the test of the network connection between the remote device and the central station. The automatically triggered event includes at least one of a test signal time interval after the first test signal is sent exceeding a test signal time interval threshold, a behavior pattern of operations performed by the user, a network condition, or a parameter measured by an onboard sensor exceeding a parameter threshold.

In some embodiments, the behavior pattern of the operations performed by the user is an event recognized by a machine learning algorithm onboard the remote device. The network condition is an event triggered by a network signal strength lower than a network signal threshold. The parameter measured by the onboard sensor includes one or more of a speed, an acceleration, an attitude, a temperature, a pressure, and global positioning system (GPS) location information of the remote device.

At S520, in response to the user's instruction or the automatically triggered event, the remote device sends a first test signal to the central station.

In some embodiments, after the wireless device receives the user input or the automatically triggered event, the remote device sends the first test signal to the central station. The first test signal includes at least one of a data message or a voice call. When the first test signal includes the data message, the first response signal includes an acknowledge data message. When the first test signal includes the voice call, the first response signal includes answering the voice call by an operator of the central station or by an automatic voice recording.

At S530, a first response signal sent from the central station for acknowledging the first test signal is received.

After the central station receives the first test signal sent from the remote device, the central station sends the first response signal to the remote device for acknowledging the first test signal. Thus, a hand-shaking between the remote device and the central station is achieved to verify the network connection is reliable.

In some embodiments, the remote device may communicate with the central station directly or through a cloud server. In some embodiments, the remote device communicates with the central station directly over a dedicated wireless communication network. In some other embodiments, the remote device communicates with the central station indirectly through a public wireless network. In this case, the remote device may send the first test signal to an intermediate cloud server, which in turn relays the first test signal to the central station.

In some embodiments, the remote device may communicate with the central station using a VoLTE or a 5G wireless communication protocol. For example, the voice call in the first test signal may be established between the remote device and the central station using the VoLTE rather than a voice communication network or a public switched telephone network (PSTN).

In some embodiments, the network connection includes a wired communication network connection, a wireless communication network connection, or a combination thereof.

At S540, in response to receiving no first response signal from the central station for acknowledging the first test signal, the remote device alerts a user of the remote device about a failure of the network connection.

In some embodiments, the network connection between the remote device and the central station fails. In one example, the central station does not receive the first test signal sent from the remote device. In another example, the central station receives the first test signal sent form the remote device, but the remote device does not receive the first response signal sent from the central station. In either case, the network connection fails, and the remote device alerts a user of the remote device about a failure of the network connection. The user may take action to remedy the failure of the network connection.

In the embodiments of the present disclosure, the remote device initiates a test of the network connection between the remote device and the central station, with or without user intervention. The test includes the hand-shaking between the remote device and the central station. Constantly testing the network connection ensures reliable communication between the remote device and the central station.

Figure 6:
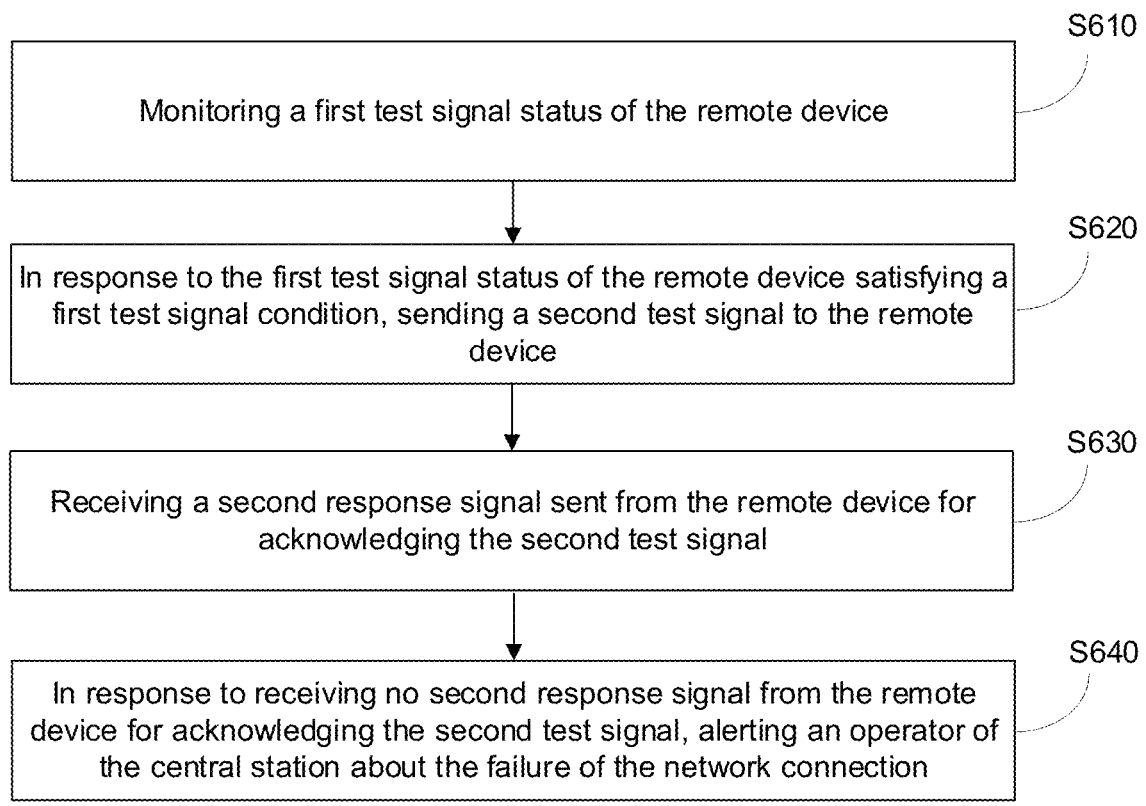
FIG. 6 illustrates a flowchart of an exemplary method for testing the network connection initiated by the central station consistent with the disclosed embodiments.

FIG. 6 illustrates a flowchart of an exemplary method for emergency communication for testing the network connection initiated by the central station consistent with the disclosed embodiments. The method is applied to an emergency response system at least including the remote device and the central station. As shown in FIG. 6, the method includes the following processes.

At S610, the central station monitors a first test signal status of the remote device.

In some embodiments, each time after the central station receives the first test signal sent from the remote device, the central station updates the first test signal status of the remote device. The first test signal status of the remote device includes at least one of a test signal time interval after the first test signal is received from the remote device or a test parameter of the first test signal. The test parameter at least includes a condition of a user of the remote device.

At S620, in response to the first test signal status of the remote device satisfying a first test signal condition, the central station sends a second test signal to the remote device.

In some embodiments, after the central station determines that the first test signal status of the remote device satisfies a first test signal condition, the central station sends the second test signal to the remote device. The first test signal condition includes at least one of a test signal time interval threshold or a test parameter threshold. In one example, the time interval since the last first test signal sent from the remote device is received by the central station exceeds the test signal time interval threshold. In other words, the first test signal status including the test signal time interval after the first test signal is received from the remote device satisfies the first test signal condition including the test signal time interval threshold. In this case, after the central station fails to receive the first test signal from the remote device for a certain time period, the central station initiates the test of the network connection. In another example, the test parameter of the first test signal sent from the remote device exceeds the test parameter threshold. In other words, the first test signal status including the test parameter of the first test signal satisfies the first test signal condition including the test parameter threshold. In this case, the test parameter of the first test signal indicates a certain condition about the remote device. Based on the certain condition of the remote device, the central station initiates the test of the network connection.

At S630, a second response signal sent from the remote device for acknowledging the second test signal is received.

In some embodiments, after the remote device receives the second test signal sent from the central station, the remote device sends the second response signal to the central station for acknowledging the second test signal. As such, the central station receives the second response signal to the central station for acknowledging the second test signal. A successful hand-shake between the remote device and the central station verifies that the network connection between the remote device and the central station is reliable.

At S640, in response to receiving no second response signal from the remote device for acknowledging the second test signal, the central station alerts an operator of the central station about the failure of the network connection.

In some embodiments, when the test of the network connection fails, the central station alerts the operator of the central station, and the operator of the central station may take action to remedy the failure of the network connection.

In the embodiments of the present disclosure, the central station initiates a test of the network connection between the remote device and the central station without user intervention. The test includes the hand-shaking between the remote device and the central station. Constantly testing the network connection ensures the reliable communication between the remote device and the central station.

The present disclosure also provides a remote device for testing a network connection in an emergency response system at least including the remote device and a central station. The remote device includes a memory storing program instructions and a processor configured to execute the program instructions to perform: receiving a user's instruction or an automatically triggered event for initiating a test of the network connection between the remote device and the central station; in response to the user's instruction or the automatically triggered event, sending a first test signal to the central station; receiving a first response signal sent from the central station for acknowledging the first test signal; and in response to receiving no first response signal from the central station for acknowledging the first test signal, alerting a user of the remote device about a failure of the network connection.

In some embodiments, the first test signal status of the remote device includes at least one of a test signal time interval after the first test signal is received from the remote device or a test parameter of the first test signal, and the first test signal condition includes at least one of a test signal time interval threshold or a test parameter threshold.

In some embodiments, the user's instruction includes an operation by a user of the remote device for initiating the test of the network connection between the remote device and the central station. The automatically triggered event includes at least one of: the test signal time interval after the first test signal is sent exceeding the test signal time interval threshold; a behavior pattern of operations performed by the user; a network condition; or a parameter measured by an onboard sensor exceeding a parameter threshold.

In some embodiments, the first test signal includes at least one of a data message or a voice call. When the first test signal includes the data message, the first response signal includes an acknowledge data message. When the first test signal includes the voice call, the first response signal includes answering the voice call by an operator of the central station or by an automatic voice recording.

In the embodiments of the present disclosure, the remote device initiates a test of the network connection between the remote device and the central station, with or without user intervention. The test includes the hand-shaking between the remote device and the central station. Constantly testing the network connection ensures reliable communication between the remote device and the central station.

The present disclosure also provides a central station for testing a network connection in an emergency response system at least including a remote device and the central station. The central station includes a memory storing program instructions and a processor configured to execute the program instructions to perform: monitoring a first test signal status of the remote device; in response to the first test signal status of the remote device satisfying a first test signal condition, sending a second test signal to the remote device; receiving a second response signal sent from the remote device for acknowledging the second test signal; and in response to receiving no second response signal from the remote device for acknowledging the second test signal, alerting an operator of the central station about the failure of the network connection.

In some embodiments, the first test signal status of the remote device includes at least one of a test signal time interval after the first test signal is received from the remote device or a test parameter of the first test signal. The first test signal condition includes at least one of a test signal time interval threshold or a test parameter threshold.

In some embodiments, the test parameter at least includes a condition of a user of the remote device.

In some embodiments, the first test signal includes at least one of a data message or a voice call. When the first test signal includes the data message, the first response signal includes an acknowledge data message. When the first test signal includes the voice call, the first response signal includes answering the voice call by an operator of the central station or by an automatic voice recording.

In the embodiments of the present disclosure, the central station initiates a test of the network connection between the remote device and the central station without user intervention. The test includes the hand-shaking between the remote device and the central station. Constantly testing the network connection ensures the reliable communication between the remote device and the central station.

Those skilled in the art should understand that all or some of the processes in above-described the embodiments of the present disclosure may be implemented by instructing relevant hardware through a computer program. The computer program may be stored in a computer-readable storage medium. When being executed, the computer program includes the processes of the above-described method embodiments. The storage medium may be a magnetic disk, an optical disk, a read-only memory (ROM), or a random-access memory (RAM), etc.

In the specification, specific examples are used to explain the principles and implementations of the present disclosure. The description of the embodiments is intended to assist comprehension of the methods and core inventive ideas of the present disclosure. At the same time, those of ordinary skill in the art may change or modify the specific implementation and the scope of the application according to the embodiments of the present disclosure. Thus, the content of the specification should not be construed as limiting the present disclosure.

What is claimed is:

1. A method for testing a network connection of an emergency response system at least including a remote device and a central station, comprising:
    in absence of emergency, receiving, by the remote device, a user's instruction or an automatically triggered event for initiating a test of the network connection between the remote device and the central station;
    in response to the user's instruction or the automatically triggered event, sending, by the remote device, a first test signal to the central station;
    receiving, by the remote device, a first response signal sent from the central station, wherein the first response signal is generated by the central station for acknowledging the first test signal after the central station receives the first test signal sent from the remote device; and
    in response to receiving no first response signal from the central station for acknowledging the first test signal, alerting, by the remote device, a user of the remote device about a failure of the network connection, for the user to remedy the failure of the network connection.

2. The method according to claim 1, wherein: a first test signal status of the remote device is monitored in the absence of emergency, and the first test signal status of the remote device includes at least one of:
    a test signal time interval after the first test signal is received from the remote device; or
    a test parameter of the first test signal; and
    the first test signal condition includes at least one of:
    a test signal time interval threshold; or
    a test parameter threshold.

3. The method according to claim 1, wherein:
    the user's instruction includes an operation by a user of the remote device for initiating the test of the network connection between the remote device and the central station; and
    the automatically triggered event includes at least one of:
    the test signal time interval after the first test signal is sent exceeding the test signal time interval threshold; a behavior pattern of operations performed by the user; a network condition; or a parameter measured by an onboard sensor exceeding a parameter threshold.

4. The method according to claim 3, wherein:
    the behavior pattern of the operations performed by the user is an event recognized by a machine learning algorithm onboard the remote device;
    the network condition is an event triggered by a network signal strength lower than a network signal threshold; and
    the parameter measured by the onboard sensor includes one or more of a speed, an acceleration, an attitude, a temperature, a pressure, and global positioning system (GPS) location information of the remote device.

5. The method according to claim 1, wherein: the first test signal includes at least one of a data message or a voice call; when the first test signal includes the data message, the first response signal includes an acknowledge data message; and when the first test signal includes the voice call, the first response signal includes answering the voice call by an operator of the central station or by an automatic voice recording.

6. The method according to claim 1, wherein the central station includes a call center, a cloud server, a backend platform, or a combination thereof.

7. The method according to claim 1, wherein: the network connection includes a wired communication network connection, a wireless communication network connection, or a combination thereof.

8. A remote device in an emergency response system at least including the remote device and a central station, comprising: a memory storing program instructions; and a processor configured to execute the program instructions to perform, for testing a network connection of the emergency response system:
    in absence of emergency, receiving a user's instruction or an automatically triggered event for initiating a test of the network connection between the remote device and the central station;
    in response to the user's instruction or the automatically triggered event, sending a first test signal to the central station;
    receiving a first response signal sent from the central station, wherein the first response signal is generated by the central station for acknowledging the first test signal after the central station receives the first test signal sent from the remote device; and
    in response to receiving no first response signal from the central station for acknowledging the first test signal, alerting a user of the remote device about a failure of the network connection, for the user to remedy the failure of the network connection.

9. The remote device according to claim 8, wherein: the first test signal status of the remote device includes at least one of:
    a test signal time interval after the first test signal is received from the remote device; or
    a test parameter of the first test signal; and
    the first test signal condition includes at least one of:
    a test signal time interval threshold; or
    a test parameter threshold.

10. The remote device according to claim 8, wherein:
    the user's instruction includes an operation by a user of the remote device for initiating the test of the network connection between the remote device and the central station; and
    the automatically triggered event includes at least one of:
    the test signal time interval after the first test signal is sent exceeding the test signal time interval threshold;
    a behavior pattern of operations performed by the user;

a network condition; or a parameter measured by an onboard sensor exceeding a parameter threshold.

11. The remote device according to claim 8, wherein:

the first test signal includes at least one of a data message or a voice call;

when the first test signal includes the data message, the first response signal includes an acknowledge data message; and when the first test signal includes the voice call, the first response signal includes answering the voice call by an operator of the central station or by an automatic voice recording.

12. A central station in an emergency response system at least including a remote device and the central station, comprising: a memory storing program instructions; and a processor configured to execute the program instructions to perform:

in absence of emergency, monitoring a first test signal status of the remote device;

in response to the first test signal status of the remote device satisfying a first test signal condition, sending a second test signal to the remote device;

receiving a second response signal sent from the remote device, wherein the first response signal is generated by the central station for acknowledging the second test signal after the central station receives the first test signal sent from the remote device; and in response to receiving no second response signal from the remote device for acknowledging the second test signal, alerting an operator of the central station about a failure of the network connection, for the operator to remedy the failure of the network connection.

13. The central station according to claim 12, wherein:

the first test signal status of the remote device includes at least one of:

a test signal time interval after the first test signal is received from the remote device; or a test parameter of the first test signal; and the first test signal condition includes at least one of:

a test signal time interval threshold; or a test parameter threshold.

14. The central station according to claim 13, wherein:

the test parameter at least includes a condition of a user of the remote device.

15. The central station according to claim 12, wherein:

the first test signal includes at least one of a data message or a voice call;

when the first test signal includes the data message, the first response signal includes an acknowledge data message; and when the first test signal includes the voice call, the first response signal includes answering the voice call by an operator of the central station or by an automatic voice recording.

16. The method according to claim 1, wherein the remote device includes a mobile phone, an unmanned aerial vehicle, an emergency response vehicle, or a combination thereof.

17. The method according to claim 1, wherein the test of the network connection is initiated between timepoints, when the remote device is not connected to the central station at such timepoints to save battery power.

18. The method according to claim 1, further including:

periodically reporting, by the remote device, a battery status to the central station.

19. The method according to claim 1, further including:

maintaining, by the central station, a database to store information of the remote device.

20. The method according to claim 1, wherein the test of the network connection is initiated after a pre-configured test signal time interval.

* * * * *